United States Patent
Tsuchiya

(10) Patent No.: US 9,906,025 B2
(45) Date of Patent: Feb. 27, 2018

(54) ELECTRIC POWER SUPPLY APPARATUS AND SYSTEM

(71) Applicant: DENSO CORPORATION, Kariya, Aichi-pref. (JP)

(72) Inventor: Shizuo Tsuchiya, Gifu (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 354 days.

(21) Appl. No.: 14/424,166

(22) PCT Filed: Aug. 29, 2013

(86) PCT No.: PCT/JP2013/005119
§ 371 (c)(1),
(2) Date: Feb. 26, 2015

(87) PCT Pub. No.: WO2014/034126
PCT Pub. Date: Mar. 6, 2014

(65) Prior Publication Data
US 2015/0326012 A1    Nov. 12, 2015

(30) Foreign Application Priority Data
Aug. 31, 2012 (JP) ................... 2012-191137

(51) Int. Cl.
*H02J 1/14* (2006.01)
*H02J 1/10* (2006.01)
(Continued)

(52) U.S. Cl.
CPC ............. *H02J 1/14* (2013.01); *B60L 11/00* (2013.01); *B60L 15/2045* (2013.01); *H02J 1/10* (2013.01);
(Continued)

(58) Field of Classification Search
CPC ................. Y10T 307/32; H02J 1/14
(Continued)

(56) References Cited

U.S. PATENT DOCUMENTS

2010/0076615 A1* 3/2010 Daniel .............. F03D 9/00
700/293
2010/0225167 A1* 9/2010 Stair ................. H02J 3/14
307/29
(Continued)

FOREIGN PATENT DOCUMENTS

JP    2004088949 A    3/2004
JP    2010098793 A    4/2010
(Continued)

OTHER PUBLICATIONS

Office Action dated Jun. 23, 2015 in corresponding Japanese Application No. 2012-191137.
(Continued)

*Primary Examiner* — Rexford Barnie
*Assistant Examiner* — Joseph Inge
(74) *Attorney, Agent, or Firm* — Harness, Dickey & Pierce, P.L.C.

(57) ABSTRACT

An electric power supply apparatus includes a controller configured to control an amount of generated power, obtained from an energy creation device, supplied to multiple power-using devices capable of being operated or charged with the generated power. The power-using devices are assigned priorities based on an order in which the power-using devices use the generated power, and the controller supplies the generated power to the power-using devices in descending order of the priorities according to the amount of the generated power obtained from the energy creation device and a predetermined supply power amount required by each power-using device.

17 Claims, 5 Drawing Sheets

(51) Int. Cl.
  B60L 11/00  (2006.01)
  H02J 7/35  (2006.01)
  B60L 15/20  (2006.01)
  H02J 3/38  (2006.01)

(52) U.S. Cl.
  CPC ............... H02J 3/383 (2013.01); H02J 7/35 (2013.01); *Y02E 10/563* (2013.01); *Y02E 60/721* (2013.01); *Y02T 10/645* (2013.01); *Y02T 10/72* (2013.01); *Y02T 10/7283* (2013.01); *Y04S 10/126* (2013.01); *Y10T 307/32* (2015.04)

(58) Field of Classification Search
  USPC .......................................................... 307/20
  See application file for complete search history.

(56) References Cited

U.S. PATENT DOCUMENTS

| | | | | |
|---|---|---|---|---|
| 2011/0006741 A1* | 1/2011 | Ando | ................ | H01M 10/488 320/162 |
| 2011/0064445 A1* | 3/2011 | Yashiro | .............. | G03G 15/5004 399/88 |

FOREIGN PATENT DOCUMENTS

| | | |
|---|---|---|
| JP | 2010273407 A | 12/2010 |
| JP | 2011017203 A | 1/2011 |
| JP | 2011135679 A | 7/2011 |
| JP | 2012005168 A | 1/2012 |
| JP | 2012-100127 | 5/2012 |
| JP | 2012-100427 | 5/2012 |

OTHER PUBLICATIONS

International Search Report and Written Opinion (in Japanese with English Translation) for PCT/JP2013/005119, dated Oct. 15, 2013; ISA/JP.

Office Action in Corresponding JP Application No. 2012-191137 dated Dec. 9, 2014 (Japanese with English Translation).

\* cited by examiner

ELECTRIC POWER SUPPLY APPARATUS AND SYSTEM

CROSS REFERENCE TO RELATED APPLICATIONS

This application is a U.S. National Phase Application under 35 U.S.C. 371 of International Application No. PCT/JP2013/005119 filed on Aug. 29, 2013 and published in Japanese as WO 2014/034126 A1 on Mar. 6, 2014. This application is based on and claims the benefit of priority from Japanese Patent Application No. 2012-191137 filed on Aug. 31, 2012. The entire disclosures of all of the above applications are incorporated herein by reference.

TECHNICAL FIELD

The present invention relates to an electric power supply apparatus and system for operating and/or charging devices by using electric power obtained from an energy creation device which generates electric power from, for example, solar energy.

BACKGROUND ART

As a conventional technique, an electric power supply system disclosed in patent literature 1 is known. When electric power flows back into a commercial power grid, and a voltage of alternating-current power converted by an inverter circuit which connects a solar battery to the commercial power grid exceeds a predetermined value, the electric power supply system starts to operate an electrical load connected between the inverter circuit and the commercial power grid. When the electrical load is operated in this way, self-consumption power increases, so that the amount of backflow of electric power decreases.

PRIOR ART LITERATURES

Patent Literature

Patent Literature 1: JP 2004-88949A

SUMMARY OF INVENTION

In the apparatus disclosed in the patent literature 1, when electric power of the grid increases due to selling of electric power, a specific electrical load is operated not to waste electric power generated by a solar power generator. However, since the backflow of electric power to the grid (selling of electric power) is not aggressively prevented, surplus power occurs. Further, when the amount of electric power generated by the solar power generator is large, it is difficult to stabilize grid power.

In view of the above, it is an object of the present disclosure to provide an electric power supply apparatus and system for preventing surplus power from occurring by effectively using electric power obtained from an energy creation device, which generates electric power from, for example, solar energy or operation of devices.

According to an aspect of the present disclosure, an electric power supply apparatus includes a controller configured to control an amount of generated power, obtained from an energy creation device, supplied to multiple power-using devices capable of being operated or charged with the generated power. The power-using devices are assigned priorities based on the order in which the power-using devices use the generated power, and the controller supplies the generated power to the power-using devices in descending order of the priorities according to the amount of the generated power obtained from the energy creation device and a predetermined supply power amount required by each power-using device.

In this aspect, the power generated by the energy creation device is distributed among predetermined power-using devices based on the priorities and predetermined power supply amounts of the devices. The power-using device with the highest priority is firstly supplied with its predetermined supply power amount, and the power-using devices with the next highest priorities can be, in turn, supplied with their respective predetermined supply power amounts from the remaining generated power. Thus, as much the power generated by the energy creation device as possible is supplied to the power-using devices so that the generated power can be used up. Therefore, the electric power supply apparatus can effectively use the power generated by the energy creation device, for example, to operate the power-using devices so that there can be no surplus power.

Further, the power supply apparatus, the power-using devices, and the energy creation device can be combined into a power supply system.

BRIEF DESCRIPTION OF THE DRAWINGS

The above and other objects, features and advantages of the present disclosure will become more apparent from the following detailed description made with reference to the accompanying drawings. In the drawings.

EMBODIMENTS FOR CARRYING OUT INVENTION

Below, embodiments of the present invention are described with reference to the drawings. Throughout the embodiments, like characters of reference indicate the same or equivalent parts, and the same description may be omitted. When only part of a structure is described in an embodiment, other part of the structure can be configured as described in a preceding embodiment.

(First Embodiment)

Figure 1:
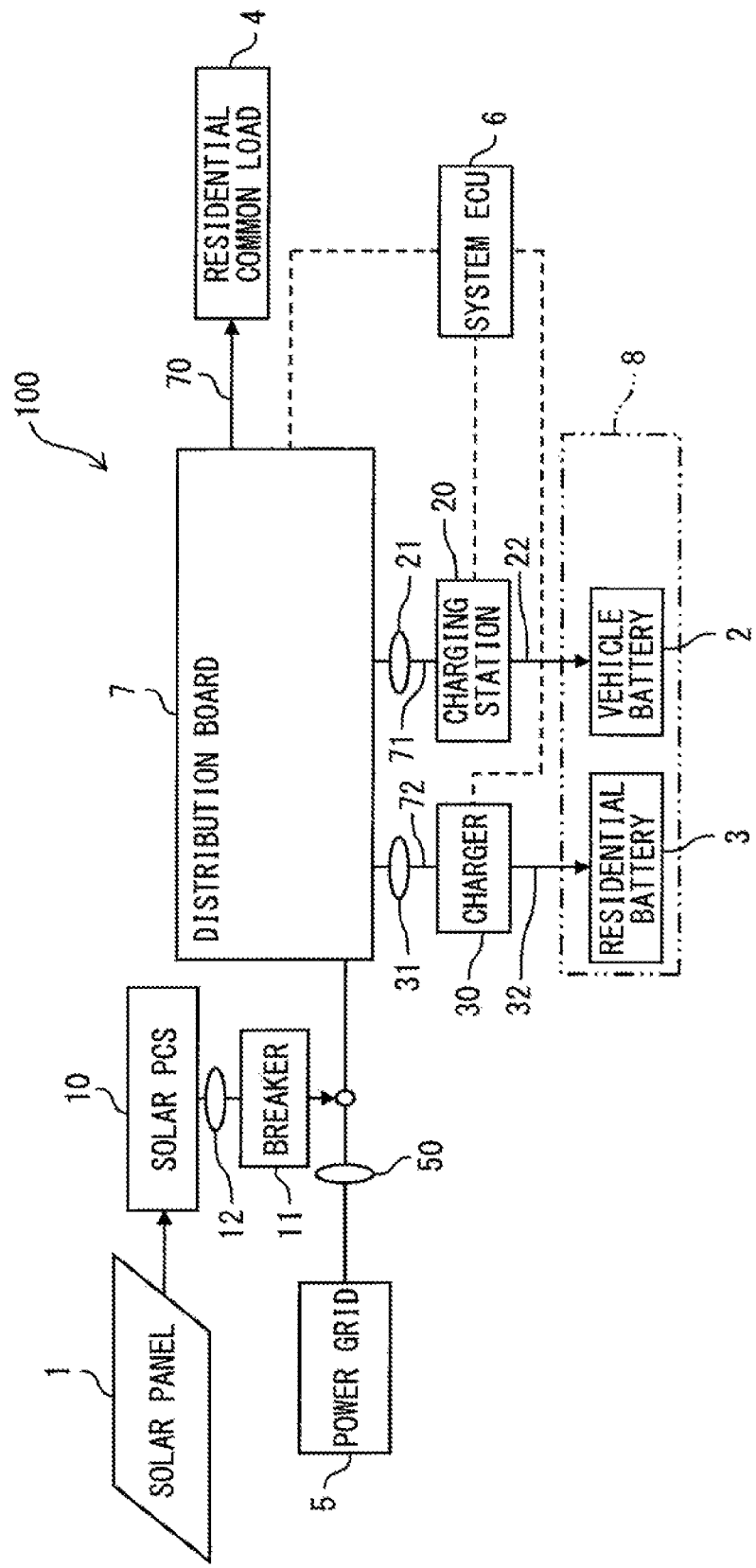
FIG. 1 is a simplified diagram illustrating a power supply system according to a first embodiment of the present invention.

As shown in FIG. 1, according to a first embodiment, an electric power supply system 100 includes a solar power generator as a creation energy device, a power-using device group 8 including multiple power-using devices operated or charged by electric power generated by the solar power generator, and a system ECU 6 for controlling the amount of electric power supplied to the power-using device group 8.

The electric power supply system 100 further includes a distribution board 7 installed in a building such as a residence, a residential common load 4 connected to a power line 70 extending from the distribution board 7, a charging station 20 for charging a vehicle battery 2 which is one of the power-using devices, and a charger 30 for charging a residential battery 3 which is one of the power-using devices.

The power-using devices included in the power-using device group 8 use electric power generated by the solar power generator and are prioritized for the use. A required amount of supply power is set individually to each power-using device. The system ECU 6 is capable of supplying the individual amount of supply power to each power-using device in the order of their priorities using the amount of electric power generated by the solar power generator. In addition to the vehicle battery 2 and the residential battery 3, the power-using devices can include a water heater, an air conditioner, a floor heater, etc.

The vehicle battery 2 is a secondary battery with a large capacity mounted on a vehicle. For example, the vehicle can be a plug-in hybrid vehicle or an electric vehicle. The residential battery 3 is a stationary power storage device fixed to a building or ground and a secondary battery with a large capacity fixed to a building. The residential battery 3 is capable of supplying electric power to, for example, a home appliance and the vehicle battery 2 which are used in a residence. For example, each of the vehicle battery 2 and the residential battery 3 can be an assembled battery in which multiple secondary cells such as lithium-ion cells are assembled together.

The solar power generator includes a solar panel 1 and a power conditioner 10. Direct-current power generated from solar energy by the solar panel 1 is delivered to the power conditioner 10. The power conditioner is an electric power converter capable of efficiently converting direct-current power generated by the solar panel 1 into alternating-current power. The electric power delivered to the power conditioner 10 is converted between alternating current and direct current and then delivered through a breaker 11 to the distribution board 7.

A power detector 12 is provided between the power conditioner 10 and the breaker 11 and detects the amount of electric power. The system ECU 6 is capable of detecting the amount of electric power supplied from the solar power generator by receiving a detection signal from the power detector 12. The electric power delivered to the distribution board 7 is supplied to a residential common load 4, the charging station 20, and the charger 30. The residential common load 4 is a common power-using device such as a home appliance. Examples of the home appliance can include a lighting device, an air conditioner, a floor heater, and bathroom heater.

For example, the power line 70 is a single-phase, three-wire alternating-current power line (having one neutral wire and two voltage wires) and supplied through the distribution board 7 with grid power of a power grid 5 of an electric power company and generated power delivered to the power conditioner 10. A power detector 50 is provided between the distribution board 7 and the power grid 5 and detects the amount of electric power delivered between them. The system ECU 6 obtains a detection signal of the power detector 50 and detects the amount of electric power supplied from the power grid 5 and the amount of electric power supplied back (the amount of electric power sold) to the power grid 5. For example, the distribution board 7 has a master breaker and a current breaker with a leak detection function to set an upper limit on current flowing through each circuit line. The power line 70 is connected to the residential common load 4 including common home appliances so that these home appliances can be supplied with electric power through the power line 70.

The charging station 20 and the charger 30 are respectively connected to power lines 71 and 72 to receive electric power from the distribution board 7. The charging station 20 charges the vehicle battery 2 with the grid power of the power grid 5 and the generated power delivered to the power conditioner 10. For example, the charger 30 includes a charge/PCS control board, a power supply converter, a communication board, and an AC/DC converter.

The power line 71 couples the distribution board 7 to the charging station 20 and is electrically connected to a charging cable 22 extending from inside to outside of the charging station 20. A charging connector is attached to an end of the charging cable 22. The charging cable 22 has a CPLT wire and a GND wire and is capable of carrying a CPLT signal. A power detector 21 is provided between the distribution board 7 and the charging station 20 and detects the amount of electric power delivered through the power line 71. A detection signal of the power detector 21 is inputted to the system ECU 6.

For example, the vehicle has a plug section for the charging connector. The vehicle battery 2 can be charged and discharged through a bidirectional inverter as an in-vehicle charger by connecting the charging connector of the charging station 20 to the plug section. When the vehicle battery 2 is charged, alternating-current power supplied through the charging cable 22 is converted by the bidirectional inverter to direct-current power with which the vehicle battery 2 is charged. On the other hand, when the vehicle battery 2 is discharged, direct-current power stored in the vehicle battery 2 is converted by the bidirectional inverter to alternating-current power which is supplied through a relay and the charging cable 22 to the charging station 20. The system ECU 6 is capable of controlling the charging and discharging of the vehicle battery 2 by controlling the bidirectional inverter.

The power line 72 couples the distribution board 7 to the charger 30 and is electrically connected to a coupling cable 32 extending from inside to outside of the charger 30. A power detector 31 is provided between the distribution board 7 and the charger 30 and detects the amount of electric power delivered through the power line 72. A detection signal of the power detector 31 is inputted to the system ECU 6.

The residential battery 3 is electrically connected to the charger 30 through the coupling cable 32. The charger 30 charges the residential battery 3 with alternating-current voltage through the coupling cable 32. Further, the residential battery 3 is capable of discharging stored direct-current power to the distribution board 7 through the coupling cable 32. The system ECU 6 is capable of controlling the charging and discharging of the residential battery 3 by controlling a bidirectional inverter in the charger 30.

The system ECU 6 is a controller capable of operations of the charging station 20, the charger 30, and the distribution board 7. The system ECU 6 determines distribution of electric power generated by the solar power generator among all the power-using devices according to a predetermined control condition and provides the amount of electric power supplied to each power-using device on an operation display unit. The operation display unit serves as an extended ECU capable of controlling the components of the power supply system 100 and also displays an operation condition of the power supply system 100. For example, the operation display unit is a remote operation means installed inside a residence. Alternatively, the system ECU 6 can be incorporated in an operation display unit capable of receiving an operation input from a user.

Next, an example of an operation of the power supply system 100 associated with a use of generated power is described below with reference to FIGS. 2 to 4B. A process related to this control is mainly performed by the system ECU 6.

Figure 2:
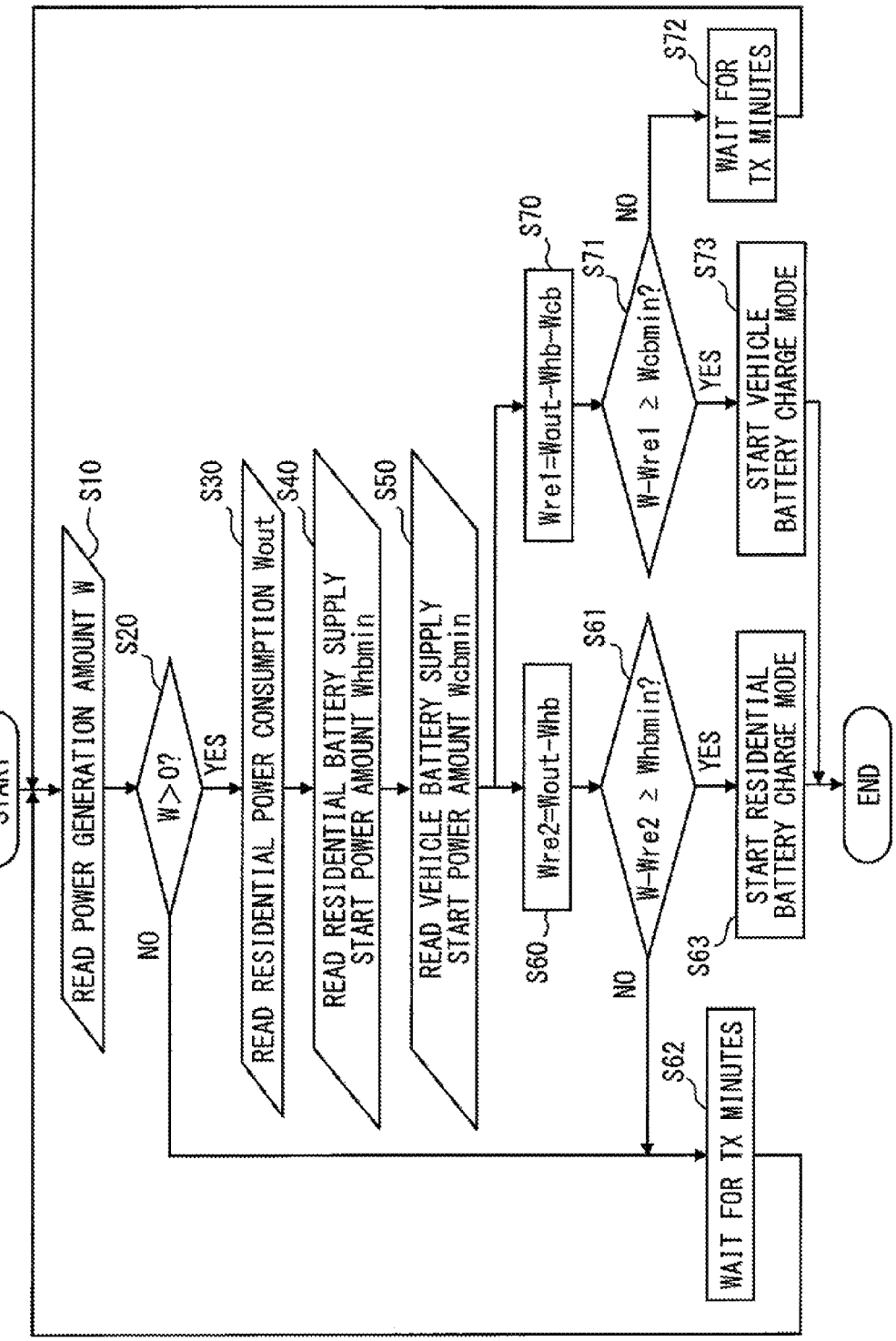
FIG. 2 is a flowchart of an operation of the power supply system associated with a use of electric power generated by a solar power generator according to the first embodiment.

The system ECU 6 starts to perform the control according to a main flowchart of FIG. 2 associated with a use of generated power at the time of day where there is a possibility that the solar power generator generates electric power. Firstly, at step 10 in FIG. 2, a generated power amount W of the solar power generator is read from the detection signal of the power detector 12. As an example, it is assumed here that the generated power amount W is 2300 (W). Then, at step 20, it is determined whether or not the generated power amount W exceeds 0 (W). If it is determined at step 20 that the solar power generator generates no electric power, it proceeds to step 10 after waiting for a predetermined time TX at step 62, and then performs the determination again at step 20.

If it is determined at step 20 that the solar power generator generates electric power, a residential consumption power Wout, which is the sum of consumption power of the residential common load 4 and the power-using device group 8, is read at step 30. Since consumption power of the power-using device group 8 is 0 (W) at this time, the residential consumption power Wout includes only consumption power of the residential common load 4 used in everyday life. Therefore, as an example, it is assumed here that the residential consumption power Wout is 1000 (W).

Further, at step 40, supply start power amount Whbmin to start to supply electric power to the residential battery 3 is read. The Whbmin is a preset value of, for example, 300 (W). Further, at step 50, supply start power amount Wcbmin to start to supply electric power to the vehicle battery 2 is read. The Wcbmin is a preset value of, for example, 1300 (W).

Then, steps 60 and 61 are performed in parallel with steps 70 and 71. Firstly, procedures performed in steps 60 and 61 are described. At step 60, a load Wre2 (=Wout−Whb) is calculated by subtracting supply power to the residential battery 3 from the residential consumption power Wout. Here, the Wout is 1000 (W), and the Whb is 0 (W) because charging power is zero at this time. As a result, the Wre2 is 1000 (W). Then, at step 61, it is determined whether a value obtained by subtracting the Wre2 from the generated power amount W is equal to or greater than the supply start power amount Whbmin.

Figure 3A:
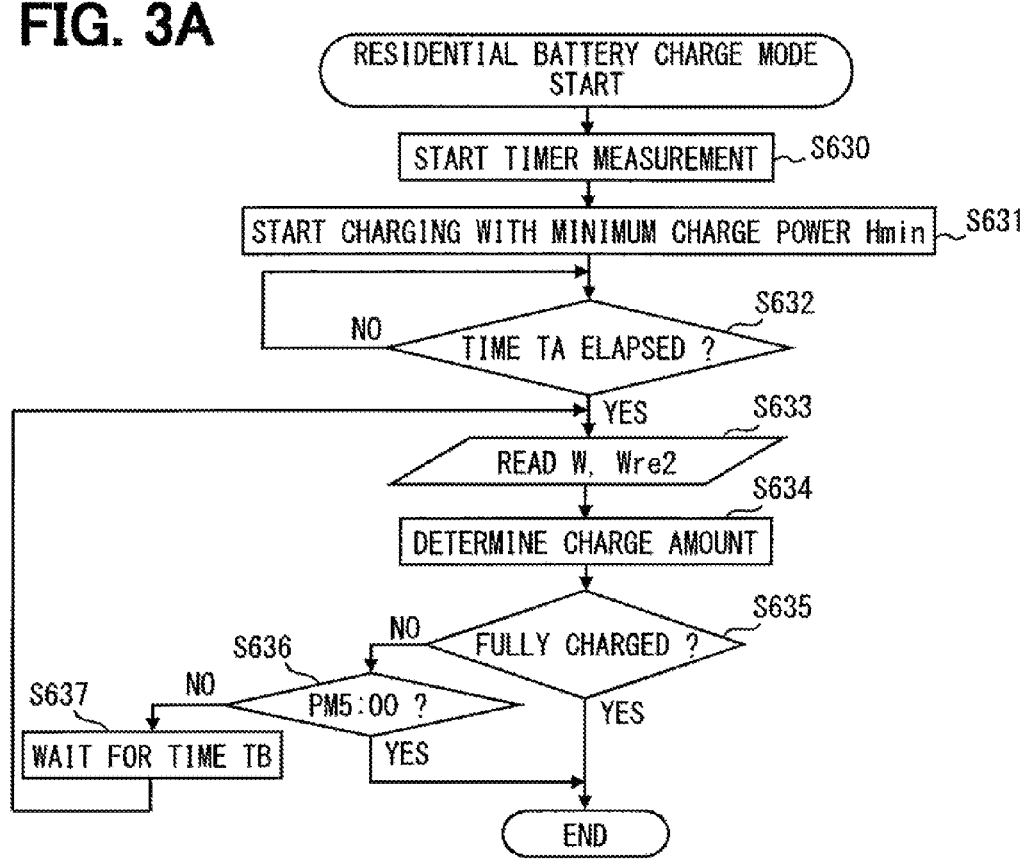
FIG. 3A is a flowchart of a process associated with a residential battery charge mode (step 63) in FIG. 2.

If it is determined at step 61 that the W−Wre2 is less than the Whbmin, it proceeds to step 10 after waiting for a predetermined time TX at step 62, and then performs the procedures to be performed after step 20. If it is determined at step 61 that the W−Wre2 is equal to or greater than the Whbmin, a subroutine shown in FIG. 3A is performed at step 63, and then this main flow is ended. The subroutine is performed to start a residential battery charging mode where the residential battery 3 is charged. At this time, since the W=2300 (W), the Wre2=1000 (W), and the Whbmin=300 (W), the W−Wre2 is 1300 (W) and greater than the Whbmin (=300(W)). Accordingly, it proceeds to step 63, and the subroutine shown in FIG. 3A is started.

Next, procedures performed at steps 70 and 71, which are performed in parallel with steps 60 and 61, are described. At step S70, a load Wre1 (=Wout−Whb−Wcb) is calculated by subtracting supply power to the residential battery 3 and supply power to the vehicle battery 2 from the residential consumption power Wout. Here, the Wout is 1000 (W), the Whb is 0 (W) because charging power is zero at this time, and the Wcb is 0 (W). As a result, the Wre1 is 1000 (W). Then, at step 71, it is determined whether a value obtained by subtracting the Wre1 from the generated power amount W is equal to or greater than the supply start power amount Wcbmin.

Figure 4A:
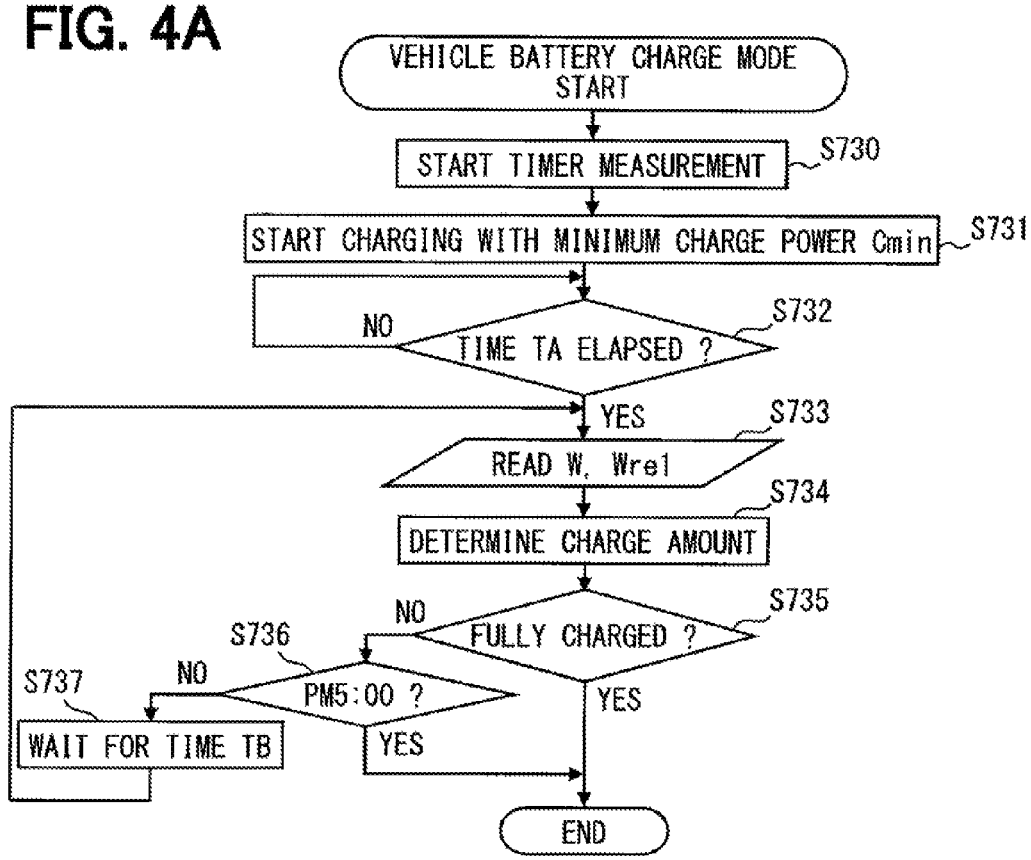
FIG. 4A is a flowchart of a process associated with a vehicle battery charge mode (step 73) in FIG. 2.

If it is determined at step 71 that the W−Wre1 is less than the Wcbmin, it proceeds to step 10 after waiting for a predetermined time TY at step 72, and then performs the procedures to be performed after step 20. If it is determined at step 71 that the W−Wre1 is equal to or greater than the Wcbmin, a subroutine shown in FIG. 4A is performed at step 73, and then this main flow is ended. The subroutine is performed to start a vehicle battery charging mode where the vehicle battery 2 is charged. At this time, since the W=2300 (W), the Wre1=1000 (W), and the Wcbmin=1300 (W), the W−Wre1 is 1300 (W) and equal to the Wcbmin (=1300(W)). Accordingly, it proceeds to step 73, and the subroutine shown in FIG. 4A is started. In this way, in an early stage of the main flow, both the residential battery charging mode and the vehicle battery charging mode are started. Thus, the residential battery 3 and the vehicle battery 2 start to be charged with minimum charging power (250 (W) in the case of the residential battery 3, and 1200 (W) in the case of the vehicle battery 2).

The system ECU 6 performs the residential battery charging mode shown by the subroutine in FIG. 3A and the vehicle battery charging mode shown by the subroutine in FIG. 4A. In the residential battery charging mode, firstly, at step 630, a timer measurement is started. Then, the charging is started with a minimum charging power Hmin (=250 (W)) (step 631), and the generated power amount W and the load Wre2 are read (step 633) after the predetermine time TA elapsed (step 632). Then, a charging amount is determined based on a value of the W−Wre2, which is calculated from the previously read values, according to a residential battery charge power characteristic line shown in FIG. 3B (step 634). The residential battery 3 is charged according to the charging amount determined at step 634. In the vehicle battery charging mode, firstly, at step 730, a timer measurement is started. Then, the charging is started with a minimum charging power Cmin (=1200 (W)) (step 731), and the generated power amount W and the load Wre1 are read (step 733) after the predetermine time TA elapsed (step 732). Then, a charging amount is determined based on a value of the W−Wre1, which is calculated from the previously read values, according to a vehicle battery charge power characteristic line shown in FIG. 4B (step 734). The vehicle battery 2 is charged according to the charging amount determined at step 734.

Figure 3B:
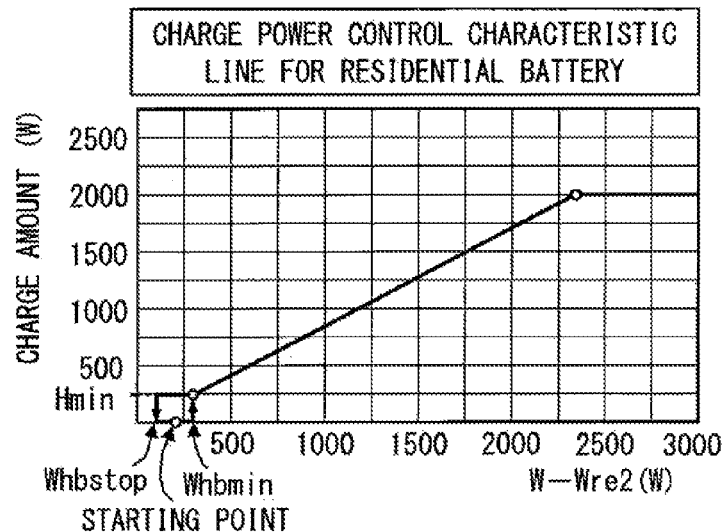
FIG. 3B is a characteristic line of charging power control of a residential battery.

That is, the residential battery charging mode proceeds in such a manner that the value of the W−Wre2 and the value of the charging amount move on the charge power characteristic line shown in FIG. 3B, and when the value of the W−Wre2 becomes 120 (W), a point Whbstop is satisfied, the charging of the residential battery 3 becomes 0 (W), and the charging of the residential battery 3 is substantially stopped. If the vehicle battery charging mode is started at the same time, the vehicle battery charging mode proceeds in such a manner that the value of the W−Wre1 and the value of the charging amount move on the charge power characteristic line shown in FIG. 4B, and when the value of the W−Wre1 becomes 1200 (W), a point Wcbstop is satisfied, the charging of the vehicle battery 2 becomes 0 (W), and the charging of the vehicle battery 2 is substantially stopped.

In the charge power characteristic line shown in FIG. 3B, when a horizontal axis reaches the supply start power amount Whbmin (300 (W)) through a starting point, the residential battery charging mode is started, and the charging is started with the minimum charging power Hmin (250 (W) in the case of the residential battery 3). In the charge power characteristic line shown in FIG. 4B, when a horizontal axis reaches the supply start power amount Wcbmin (1300 (W)) through a starting point, the vehicle battery charging mode is started, and the charging is started with the minimum charging power Cmin (1200 (W) in the case of the vehicle battery 2).

In the residential battery charging mode, at step 635, it is determined whether a SOC (State Of Charge) of the battery is in a fully charged state. If it is in the fully charged state, the residential battery charging mode is ended. If it does not reach the fully charged state yet, it is determined whether it is five o'clock P.M. (step 636). If it is five o'clock P.M. already, the residential battery charging mode is ended because it is difficult to obtain generated power due to a small amount of sunlight. If it is not five o'clock P.M. yet, it returns to step 633 after waiting for a predetermined time TB at step 637, so that the charging is continued.

Likewise, in the vehicle battery charging mode, at step 735, it is determined whether a SOC of the battery is in a fully charged state. If it is in the fully charged state, the vehicle battery charging mode is ended. If it does not reach the fully charged state yet, it is determined whether it is five o'clock P.M. (step 736). If it is five o'clock P.M. already, the residential battery charging mode is ended. If it is not five o'clock P.M. yet, it returns to step 733 after waiting for the predetermined time TB at step 737, so that the charging is continued.

It is assumed that neither the generated power amount W nor consumption power in the residential common load 4 change in the residential battery charging mode and the vehicle battery charging mode which are started at the same time. In this case, since the minimum charging power Cmin of the vehicle battery 2=1200 (W), the minimum charging power Hmin of the residential battery 3=250 (W), and the generated power amount W=2300 (W), the residential consumption power Wout=1000+250+1200=2450 (W), the Wre2=2450−250=2200 (W), and Wre1=2450−250−1200=1000 (W).

As a result, in the residential battery charging mode, the W−Wre2=2300−2200=100 (W). Since this value is less than the point Whbstop (=120 (W)) on the charge power control characteristic line at step S634, the charging of the residential battery 3 is controlled to 0 (W) so that the charging of the residential battery 3 can be substantially stopped. In contrast, in the vehicle battery charging mode, the W−Wre1=2300−100=1300 (W). Since this value is not less than the supply start power amount Wcbmin (1300 (W)) on the charge power characteristic line at step S734, the vehicle battery charging mode is continued. After that, the charging of the vehicle battery 2 is continued preferentially regardless of the charging state of the residential battery 3 until the value of the W−Wre1 decreases below the point Wcbstop (=1200 (W)).

As described above, in the power supply system according to the first embodiment, the power generated by the solar power generator is preferentially distributed to the vehicle battery 2 having a higher priority than the residential battery 3 among multiple power-using devices. Further, when the generated power is still left after being supplied to the residential common load 4 and the power-using device having the highest priority, the remaining generated power is supplied to the power-using device (e.g., the residential battery 3) having the second highest priority. Thus, the power generated by the solar power generator is consumed by multiple power-using devices according to priorities and power supply amounts assigned in advance to the power-using devices. In such an approach, as much the generated power as possible is consumed, and surplus power is less likely to occur accordingly.

In the vehicle battery charging mode to charge the vehicle battery 2, the system ECU 6 firstly confirms that the charging connector attached to the end of the charging cable 22 is connected to the plug section through, for example, CPLT communication and transmits a connection complete notification via a LAN to the operation display unit installed inside the residence. For example, the operation display unit displays the connection complete notification on a display screen. Then, the system ECU 6 starts PLC communication and transmits vehicle-side information detected through the PLC communication to the operation display unit via the LAN. For example, the operation display unit displays vehicle information on the display screen.

Further, in the vehicle battery charging mode, when confirming that the charging connector is connected to the vehicle through, for example, CPLT communication, the system ECU 6 turns OFF a relay interposed in a DC power line of the vehicle. Then, when a charge start command is transmitted via the LAN from the operation display unit in response to an operation of an operation switch of the operation display unit, the system ECU 6 turns ON the relay and instructs a bidirectional inverter in the vehicle through, for example, CPLT communication, to start charging with a specified power. When determining at step 735 that the SOC is in the fully charged state, the system ECU 6 waits after sending charge end information to the operation display unit via the LAN. For example, the operation display unit displays the charge end information on the display screen.

Each of the prioritized power-using devices has an individual predetermined supply power range and has a minimum supply power. Examples of distribution of generated power among the power-using devices are described below.

For example, it is assumed that the device with the highest priority has a minimum supply power of 300 (W) and a predetermined supply power range of from 300 to 1500 (W), the device with the second highest priority has a minimum supply power of 1200 (W) and a predetermined supply power range of from 1200 to 2400 (W), and the device with the third highest priority has a minimum supply power of 500 (W) and a predetermined supply power range of from 500 to 1000 (W).

When the generated power is 500 (W), the system ECU 6 performs control that uses up the generated power by supplying 500 (W) to the device with the highest priority only. When the generated power is 2700 (W), the system ECU 6 performs control that uses up the generated power by supplying 1500 (W) to the device with the highest priority and by supplying 1200 (W) to the device with the second highest priority.

Further, when the generated power is 2900 (W), and there is no need to supply power to the device with the highest priority (for example, when the device is a secondary battery and in a fully charged state), the system ECU 6 assigns top priority to the device with the second highest priority and performs control that uses up the generated power by supplying 2400 (W) to the device with the second highest priority and by supplying 500 (W) to the device with the third highest priority.

Further, when starting power supply to the device with the highest priority, the system ECU 6 can perform control that supplies no power to the device with a lower priority until the power supplied to the device with the highest priority reaches a maximum value of its predetermined supply power. In this case, the control is performed so that the power supply to the device with the second highest priority can be started after the power supply to the device with the highest priority reaches its maximum value.

When the device with the highest priority is a power storage device such as a secondary battery and severely deteriorated, the device can be charged with only power smaller than the maximum value of the predetermined supply power. For this reason, when the device with the highest priority is severely deteriorated, it is likely that power supply to the device with the second highest priority will be performed.

In a situation where power supply to the device with a higher priority cannot be performed, the system ECU 6 performs control that starts power supply to the device with a next higher priority. For example, when the device with a higher priority is the vehicle battery 2, the situation is where the charging connector attached to the end of the charging cable 22 is not connected to, i.e., disconnected from the plug section of the vehicle The effects brought by the power supply system 100 according to the first embodiment are as follows. In the power supply system 100, the system ECU 6 supplies power generated by the solar power generator in descending order of priority according to the amount of the generated power and a predetermined supply power amount required by an individual power-using device.

In such an approach, the power generated by the solar power generator is distributed among the power-using devices based on the priorities and predetermined power supply amounts assigned to individual power-using devices of the power-using device group 8. The power-using device with the highest priority is firstly supplied with its corresponding predetermined supply power amount from the generated power, and the power-using devices with next highest priorities can be, in turn, supplied with their respective predetermined supply power amounts from the remaining generated power to the extent possible. Thus, as much the power generated by the solar power generator as possible is supplied to the power-using devices so that the generated power can be used up. Therefore, it is possible to prevent the generated power from being sold as surplus power to the power grid 5.

Further, the system ECU 6 can supply the power generated by the solar power generator to not only the power-using devices which are prioritized but also the residential common load 4 which is not prioritized. The system ECU 6 subtracts the sum of the predetermined supply power amounts (Whb, Wcb) of all the prioritized devices from the total consumption power amount Wout, which is the sum of consumption power of the residential common load 4 and the power-using devices, thereby calculating the power load amount Wre1 except the supply power amounts to all the prioritized devices (the vehicle battery 2, the residential battery 3) (step 70).

Further, when determining that the value calculated by subtracting the power load amount Wre1 from the generated power amount W is equal to or greater than the predetermined minimum supply power amount Wcbmin (step 71), the system ECU 6 supplies the power generated by the solar power generator to the power-using device (the vehicle battery 2) with the highest priority (step 73).

Thus, the power load amount Wre1 is calculated at step 70 by using the following operational expression: Wre1=Wout−Whb−Wcb. Therefore, the power load amount Wre1 is defined as a value calculated by subtracting not only the supply power amount to the device with the highest priority but also supply power amounts to other prioritized devices from the total consumption power amount Wout. Accordingly, the power load amount Wre1 for the device with the highest priority becomes smaller than the power load amount (e.g., Wre2) for the device with a lower priority. Thus, it is likely that the value (=W−Wre1) calculated by subtracting the power load amount Wre1 from the generated power amount W will be greater than the value (=W−Wre2) calculated by subtracting the power load amount Wre2 from the generated power amount W. Therefore, the value W−Wre1 for the device with the highest priority is likely to be determined as being equal to or greater than the predetermined minimum supply power amount compared to those for other devices. In this way, the system ECU 6 can perform control that surely distributes the amount of power generated by the solar power generator to the power-using device with the highest priority.

(Second Embodiment)

A generated power use control according to a second embodiment corresponds to a modification of the flowchart shown in FIG. 2 described in the first embodiment. The second embodiment is identical in the structure of the power supply system 100 and its operations and effects to the first embodiment, but differs in that the residential battery 3 is assigned the highest priority, and the vehicle battery 2 is assigned the second highest priority.

Figure 5:
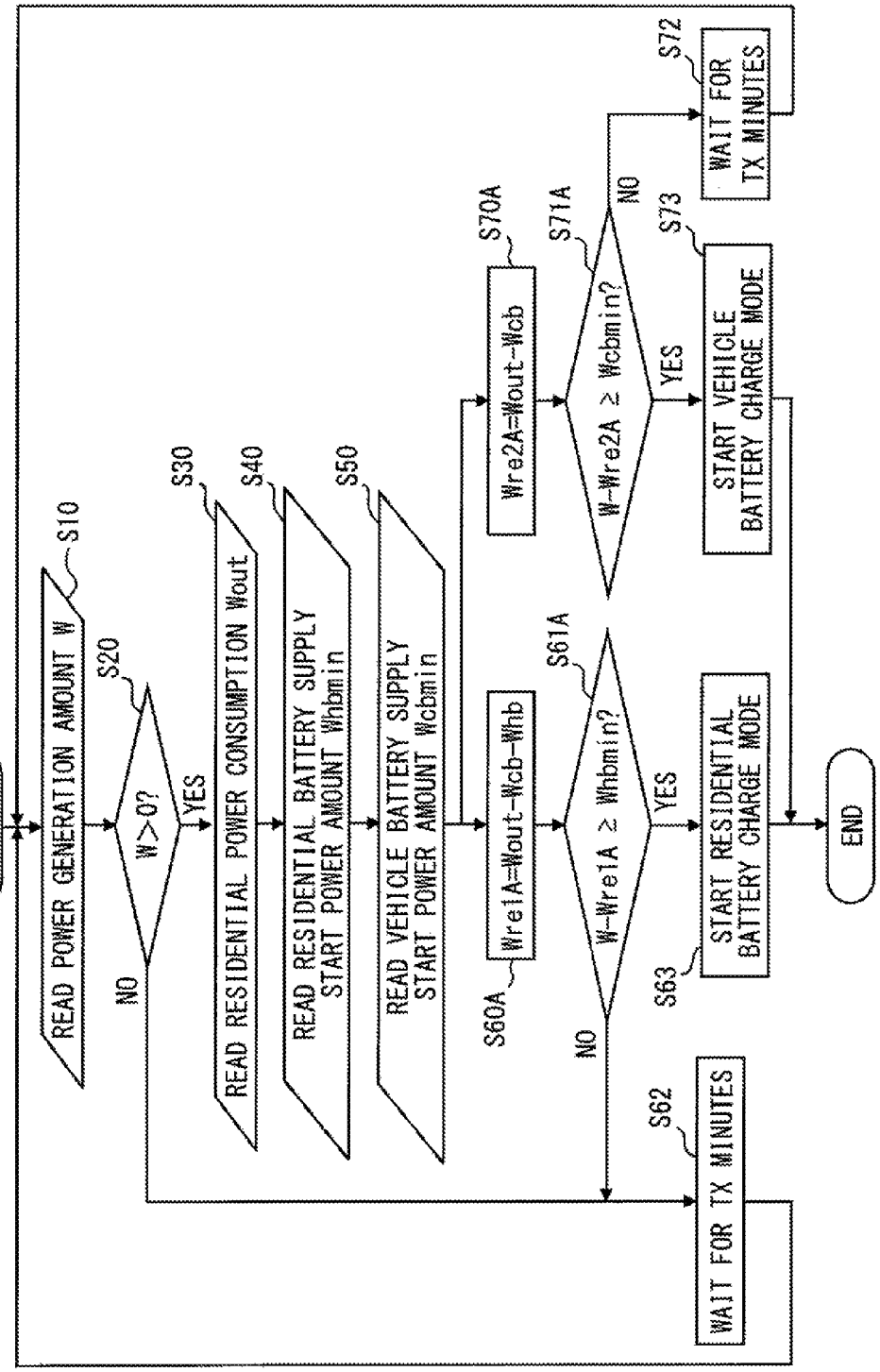
FIG. 5 is a flowchart of an operation of a power supply system associated with a use of electric power generated by a solar power generator according to a second embodiment.

Next, the generated power use control according to the second embodiment is described below with reference to a flowchart shown in FIG. 5. The control performed in the second embodiment is identical in steps 10, 20, 30, 40, 50, 62, 63, 72, and 73, the residential battery charging mode shown in FIG. 3A, and the vehicle battery charging mode shown in FIG. 3B to the control performed in the first embodiment. Only differences from the first embodiment are described.

In the control of the second embodiment, steps 60A and 61A are performed in parallel with steps 70A and 71A. Firstly, procedures performed in steps 60A and 61A are described. At step 60A, a load Wre1A (=Wout−Wcb−Whb) is calculated by subtracting supply power to the residential battery 3 and supply power to the vehicle battery 2 from the residential consumption power Wout. In an early stage, the Wout is 1000 (W), the Whb is 0 (W) because charging power is zero at this time, and the Wcb is 0 (W). As a result, the Wre1A is 1000 (W). Then, at step 61A, it is determined whether a value calculated by subtracting the Wre1A from the generated power amount W is equal to or greater than the supply start power amount Whbmin.

Figure 4B:
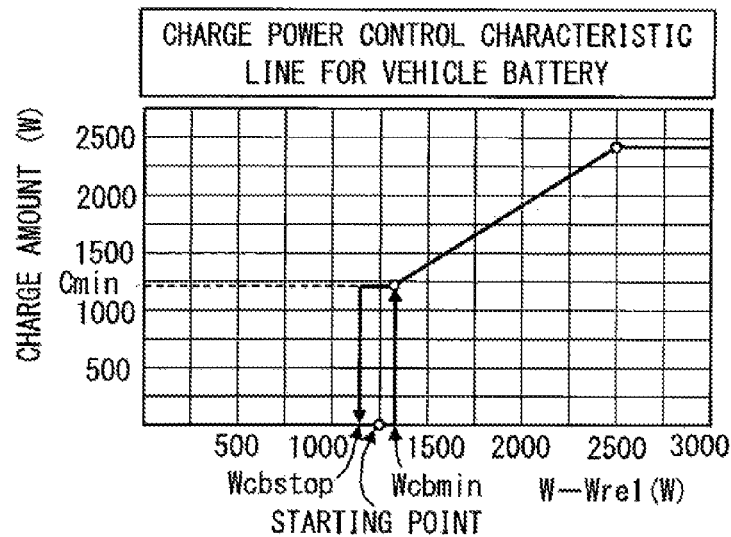
FIG. 4B is a characteristic line of charging power control of a vehicle battery.

If it is determined at step 61A that the W−Wre1A is less than the Whbmin, it proceeds to step 10 after waiting for a predetermined time TX at step 62, and then performs the procedures to be performed after step 20. If it is determined at step 61A that the W−Wre1A is equal to or greater than the Whbmin, the subroutine shown in FIG. 3A is performed at step 63, and then this main flow is ended. The subroutine is performed to start the residential battery charging mode where the residential battery 3 is charged. It is noted that Wre2 in FIGS. 3A and 3B is replaced with Wre1A and that Wre1 in FIGS. 4A and 4B is replaced with Wre2A.

At this time, since the W=2300 (W), the Wre1A=1000 (W), and the Whbmin=300 (W), the W−Wre1A is 1300 (W) and greater than the Whbmin (=300 (W)). Accordingly, it proceeds to step 63, and the subroutine shown in FIG. 3A is started.

Next, procedures performed at steps 70A and 71A, which are performed in parallel with steps 60A and 61A, are described. At step 70, a load Wre2A (=Wout−Wcb) is calculated by subtracting supply power to the vehicle battery 2 from the residential consumption power Wout. Here, the Wout is 1000 (W), and the Wcb is 0 (W) because charging power is zero at this time. As a result, the Wre2A is 1000 (W). Then, at step 71A, it is determined whether a value calculated by subtracting the Wre2A from the generated power amount W is equal to or greater than the supply start power amount Wcbmin.

If it is determined at step 71A that the W−Wre2 is less than the Wcbmin, it proceeds to step 10 after waiting for a predetermined time TY at step 72, and then performs the procedures to be performed after step 20. If it is determined at step 71A that the W−Wre2A is equal to or greater than the Wcbmin, a subroutine shown in FIG. 4A is performed at step 73, and then this main flow is ended. The subroutine is performed to start the vehicle battery charging mode where the vehicle battery 2 is charged.

At this time, since the W=2300 (W), the Wre2A=1000 (W), and the Wcbmin=1300 (W), the W−Wre2A is 1300 (W) and equal to the Wcbmin (=1300(W)). Accordingly, it proceeds to step 73, and the subroutine shown in FIG. 4A is started. In this way, in the early stage of the main flow, both the residential battery charging mode and the vehicle battery charging mode are started. Thus, the residential battery 3 and the vehicle battery 2 start to be charged with their minimum charging powers (250 (W) in the case of the residential battery 3, and 1200 (W) in the case of the vehicle battery 2).

It is assumed that neither the generated power amount W nor consumption power in the residential common load 4 change in the residential battery charging mode and the vehicle battery charging mode which are started at the same time. In this case, since the minimum charging power Hmin of the residential battery 3=250 (W), the minimum charging power Cmin of the vehicle battery 2=1200 (W), and the generated power amount W=2300 (W), the residential consumption power Wout=1000+250+1200=2450 (W), the Wre2A=2450−1200=1250 (W), and Wre1A=2450−1200−250=1000 (W).

As a result, in the vehicle battery charging mode, the W−Wre2A=2300−1250=1050 (W). Since this value is less than the point Wcbstop (=1200 (W)) on the charge power characteristic line at step S734, the charging of the vehicle battery 2 is controlled to 0 (W) so that the charging of the vehicle battery 2 can be substantially stopped. In contrast, in the residential battery charging mode, the W−Wre1A=2300−1000=1300 (W). Since this value is not less than the supply start power amount Whbmin (250 (W)) on the charge power characteristic line at step S634, the residential battery charging mode is continued. After that, the charging of the residential battery 3 is continued preferentially regardless of the charging state of the vehicle battery 2 until the value of the W−Wre1A decreases below the point Whbstop (=120 (W)).

As described above, in the power supply system according to the second embodiment, the power generated by the solar power generator is preferentially distributed to the residential battery 3 having a higher priority than the vehicle battery 2 among multiple power-using devices. Further, when the generated power is still left after being supplied to the residential common load 4 and the power-using device having the highest priority, the remaining generated power is supplied to the power-using device (e.g., the vehicle battery 2) having the second highest priority.

(Modifications)

While the present disclosure has been described with reference to the embodiment, it is to be understood that the disclosure is not limited to the embodiment. The present disclosure is intended to cover various modifications and equivalent arrangements inside the spirit and scope of the present disclosure.

The energy creation device is not limited to a device which generates electric power from sunlight. It can include a device which generates electric power from other natural energy such as wind power, geothermal power, wave power, and water power. Further, it can be a device which generates electric power using a fuel cell or a cogeneration device. Furthermore, it can be a device which generates electric power by combining these.

In the power supply system according to the above embodiments, priorities of the power-using devices included in the power-using device group 8 are predetermined. Alternatively, the priorities can be newly determined and updated by a user's intention or by the system ECU 6 based on a predetermined priority determination condition.

For example, the user can freely change the priorities using an operation device which is wired or wirelessly connected to the system ECU 6.

For example, the system ECU 6 can prioritize multiple power-using devices in descending order of minimum consumption power. In this case, a formula for calculating surplus power (W−Wout) used for operation start determination for each device can be modified as follows. Here, it is assumed that the power-using device group 8 includes a hot water storage-type hot water supply device in addition to the vehicle battery 2 and the residential battery 3 and that a minimum consumption power (minimum charge power) Cmin of the vehicle battery 2, a minimum consumption power (minimum charge power) Hmin of the residential battery 3, and a minimum consumption power (minimum charge power) Smin of the hot water supply device satisfy the following relationship: Cmin>Smin>Hmin.

To start the charging of the vehicle battery 2 with the surplus power only, the surplus power needs to be equal to or greater than the Cmin. However, the hot water supply device and the residential battery 3 start to be changed with the Smin and Hmin, respectively, which are less than the Cmin. Therefore, the charging of the vehicle battery 2 having the higher priority (capable of using more surplus power) is not started unless the surplus power becomes equal to or greater than Cmin+Smin+Hmin. To resolve this contradiction, a formula for calculating a surplus power Wc1 used for operation start determination of the vehicle battery 2 is set to a formula (1).

$$Wc1 = (W - Wout) - Wcb - Wsb - Whb \tag{1}$$

In the formula (1), Wcb represents actual charge in the vehicle battery 2, Wsb represents actual consumption power in the hot water supply device, and Whb represents actual consumption power in the residential battery 3.

Likewise, a formula for calculating a surplus power Ws1 used for operation start determination of the hot water supply device is set to a formula (2).

$$Ws1 = (W - Wout) - Wsb - Whb \tag{2}$$

Likewise, a formula for calculating a surplus power Wh1 used for operation start determination of the residential battery 3 is set to a formula (3).

$$Wh1=(W-Wout)-Whb \quad (3)$$

By modifying surplus power calculation formulas in this way, the devices start their operations as follows.

When Smin>Wh1≥Hmin, only the residential battery 3 starts being charged.

When Cmin>Ws1≥Hmin, the hot water supply device starts being operated. At this time, if Ws1−Smin<Hmin, the residential battery 3 stops being charged, and if Ws1−Smin≥Hmin, the residential battery 3 starts being charged.

When Wc1≥Cmin, the vehicle battery 2 starts being charged. At this time, if Wc1−Cmin<Smin, the hot water supply device stops being operated. In this case, if Wc1−Cmin<Hmin, the residential battery 3 stops being charged, and if Wc1−Cmin≥Hmin, the residential battery 3 starts being charged. In contrast, if Wc1−Cmin≥Smin, the hot water supply device starts being operated. In this case, if Wc1−Cmin<Smin+Hmin, the residential battery 3 stops being charged, and if Wc1−Cmin≥Smin+Hmin, the residential battery 3 starts being charged.

By assigning the surplus power calculation formulas according to the priorities, the operation of the device having the highest priority can be surely performed. Further, when the amount of surplus power is greater than the amount of power necessary to operate the device having the highest priority, another device having a lower priority can be operated at the same time. Thus, since the amount of surplus power flowing back into the power grid is reduced, fluctuations in regional grid power due to an increase in voltage can be prevented.

In this case, the system ECU 6 can update the priorities depending on circumstances. For example, when the priorities are defined as times necessary for full charge and full heat accumulation and determined such that the hot water supply device>the residential battery 3>the vehicle battery 2, the formulas for calculating the surplus power (W−Wout) used for operation start determination of each device is set as follows.

$$Ws1=(W-Wout)-Wsb-Whb-Wcb \quad (4)$$

$$Wh1=(W-Wout)-Whb-Wcb \quad (5)$$

$$Wc1=(W-Wout)-Wcb \quad (6)$$

In this case, when Smin>Wh1≥Hmin, only the residential battery 3 starts being charged.

Further, when Ws1≥Smin, the hot water supply device starts being operated. In this case, if Ws1−Smin<Hmin, the residential battery 3 stops being charged, and if Ws1−Smin≥Hmin, the residential battery 3 starts being charged. Further, if Ws1−Smin≥Hmin+Cmin, the vehicle battery 2 also starts to be charged.

In the power supply system according to the above embodiments, when determining whether the device having the highest priority can be operated to determine whether the devices having higher priorities can be operated according to the actual amount of surplus power, the system ECU 6 can consider that consumption power in each power-using device to be controlled is 0 kw. Further, when determining whether the device having the second highest priority can be operated, the system ECU 6 can consider that consumption power in each power-using device except the device having the highest priority is 0 kw. That is, when determining whether the device having the Nth priority (N is a natural number) can be operated, it can be considered that consumption power in each power-using device except the devices having the first to (N−1)th priorities is 0 kw.

In the power supply system according to the above embodiments, when the power-using devices include multiple power storage devices, such as secondary cells, the system ECU 6 can detect SOCs of the power storage devices and update the priorities of the power storage devices in ascending order of the SOCs. In such an approach, it is less likely that a shortage of charge occurs in the system. Alternatively, the system ECU 6 can update the priorities of the power storage devices in descending order of the SOCs. In such an approach, the number of devices in a fully charged state in the system can be increased.

In the power supply system according to the above embodiments, when the power-using devices include multiple power storage devices, such as secondary cells, having individual change amount thresholds, the system ECU 6 can determine the priorities according to the thresholds. For example, the system ECU 6 can prioritize the power storage devices in descending order of the thresholds. Alternatively, the system ECU 6 can prioritize the power storage devices in ascending order of the thresholds.

In the power supply system according to the above embodiments, the system ECU 6 can update the priorities of the power storage devices in descending order of power supply frequencies which are based on their past track records during a predetermined period. Further, regarding a certain device having a predetermined priority, when the predetermined priority is higher than a rank of the power supply frequency of the certain device which is based on its past track record during a predetermined period, the priority of the certain device be increased by a predetermined rank. Alternatively, regarding a certain device having a predetermined priority, when the predetermined priority is lower than a rank of the power supply frequency of the certain device which is based on its past track record during a predetermined period, the priority of the certain device can be reduced by a predetermined rank.

In the power supply system according to the above embodiments, when the power-using devices included in the power-using device group 8 includes a hot water storage-type hot water supply device, the system ECU 6 detects the amount of hot water stored in the hot water supply device. When determining that the amount of the stored hot water is small and insufficient, the system ECU 6 updates the priority of the hot water supply device so that the hot water supply device can have the highest priority. In such an approach, even when the amount of hot water used is unexpectedly large, shortage of hot water can be prevented. Further, the power supply system can have goop energy use efficiency and be useful for a user.

In the above embodiments, LAN communication, PLC communication, and CPLT communication are used in communication for exchanging information between components. Alternatively, communication methods other than those described in the embodiments can be employed. Further, the communication method is not limited to wired communication, but includes wireless commination.

In the above embodiments, the building where the residential common load as a common power-using device is installed is a residence, but not limited to this. For example, the building can be a commercial facility, a communal facility, a factory, or a warehouse.

What is claimed is:

1. An electric power supply system comprising:
a solar power generator generating a power from a solar energy;
a plurality of power-using devices capable of operating and being charged with a generated power that is the power generated by the solar power generator;
a controller configured to control an amount of the generated power supplied to the plurality of power-using devices: wherein
the plurality of power-using devices are assigned priorities based on an order in which the plurality of power-using devices use the generated power,
each of the plurality of power-using devices has an individual predetermined supply power range, and the predetermined supply power range has a minimum supply power and a maximum supply power,
the plurality of power-using devices include a high-priority power-using device and a low-priority power-using device, a priority of the high-priority power-using device is higher than a priority of the low-priority power-using device,
when the generated power is greater than the minimum supply power of the predetermined supply power range of the high-priority power-using device, the controller supplies the generated power to the high-priority power-using device until the generated power increases equal to the maximum supply power of the predetermined supply power range of the high-priority power-using device,
when a remaining power amount obtained by subtracting a power amount supplied to the high-priority power-using device from the generated power is greater than the minimum supply power of the predetermined supply power range of the low-priority power-using device, the controller supplies the remaining power amount also to the low-priority power-using device,
in each of the plurality of power-using devices, a predetermined condition is set for starting a power supply to the corresponding power-using device regardless of the assigned priority, and
the controller determines whether the predetermined condition for starting the power supply to each of the plurality of power-using devices is satisfied, and supplies the generated power to one of the plurality of power-using devices when the predetermined condition of the one of the plurality of power-using devices is satisfied even though the one of the plurality of power-using devices is the low-priority power-using device.

2. The electric power supply system according to claim 1, wherein
the controller is capable of supplying the generated power obtained from the solar power generator to both the plurality of power-using devices assigned with the priorities and a common power-using device assigned with no priority,
the controller calculates a power load amount by subtracting supply power amounts of all of the plurality of power-using devices assigned with the priorities from a total use power amount which is a total power to be used in the plurality of power-using devices and the common power-using device, and
when determining that a value calculated by subtracting the power load amount from the amount of the generated power obtained from the solar power generator is not less than a predetermined minimum supply power amount, the controller supplies the generated power obtained from the solar power generator to the power-using device having the highest priority.

3. The electric power supply system according to claim 1, wherein
the controller determines the priorities according to a predetermined priority determination condition.

4. The electric power supply system according to claim 3, wherein
the controller determines the priorities based on minimum consumption powers of the plurality of power-using devices.

5. The electric power supply system according to claim 4, wherein
the controller determines the priorities in such a manner that as the minimum consumption power is higher, the priority is higher.

6. The electric power supply system according to claim 5, wherein
the controller determines whether the power-using device can be operated based on an actual surplus power amount, and
when determining whether the power-using device having the Nth priority, where N is a natural number, can be operated, the actual surplus power amount is calculated by considering that consumption power in each power-using device except the plurality of power-using devices having the first to N−1th priorities is 0 kw.

7. The electric power supply system according to claim 3, wherein
the controller calculates frequencies of power supply to the plurality of power-using devices based on past track records during a predetermined period, and determines the priorities based on the frequencies.

8. The electric power supply system according to claim 7, wherein
the controller determines the priorities in descending order of the frequencies.

9. The electric power supply system according to claim 1, wherein
the plurality of power-using devices include a first power storage device and a second power storage device, and
the controller detects a state of charge of each power storage device and determines the priorities in such a manner that as the state of charge is lower, the priority is higher.

10. The electric power supply system according to claim 1, wherein
the plurality of power-using devices include a first power storage device and a second power storage device,
each power storage device has a threshold for an amount of charge, and
the controller detects the threshold of each power storage device and determines the priorities in such a manner that as the threshold is higher, the priority is higher.

11. The electric power supply system according to claim 9, wherein
the first power storage device is mounted on a vehicle, and the second power storage device is fixed in a building.

12. The electric power supply system according to claim 1, wherein
the plurality of power-using devices include a heat accumulator.

13. The electric power supply system according to claim 12, wherein
the heat accumulator is a hot water storage-type hot water supply device capable of accumulating heat by heating water.

14. The electric power supply system according to claim 1, wherein
the energy creation device generates electric power from natural energy.

15. The electric power supply system according to claim 1, wherein
the priorities are capable of being changed by a user.

16. The power supply system according to claim 1, further comprising:
an operation device wired or wirelessly connected to the controller, wherein
the operation device allows a user to change the priorities.

17. The electric power supply system according to claim 1, wherein,
when the controller determines that the predetermined condition for starting the power supply in the low-priority power-using device is satisfied, the controller supplies the generated power to the low-priority power-using device even though the power supply to the high-priority power-using device with the generated power is not yet started.

\* \* \* \* \*